Sept. 30, 1969   W. C. RIESTER ET AL   3,469,863
FLUID COUPLING ASSEMBLY
Filed April 5, 1967   3 Sheets-Sheet 1

INVENTOR.
WILLIAM C. RIESTER and
BRONISLAUS S. GRACZYK
BY E. Herbert Liss
ATTORNEY.

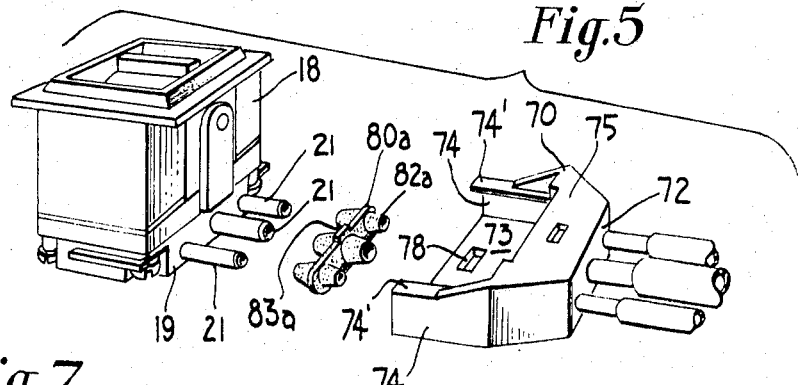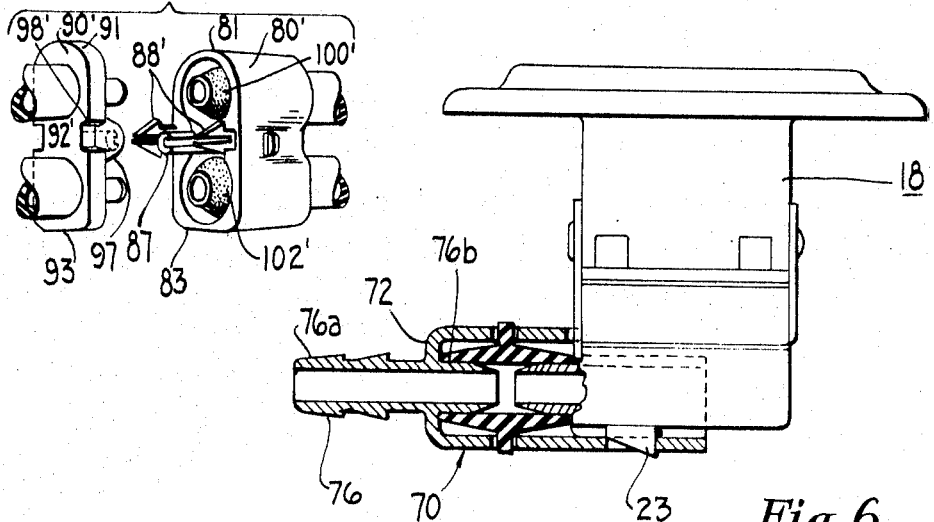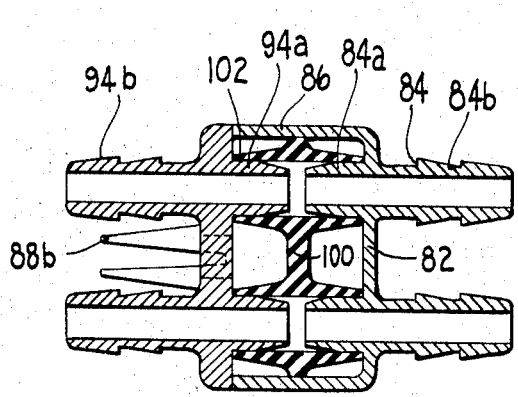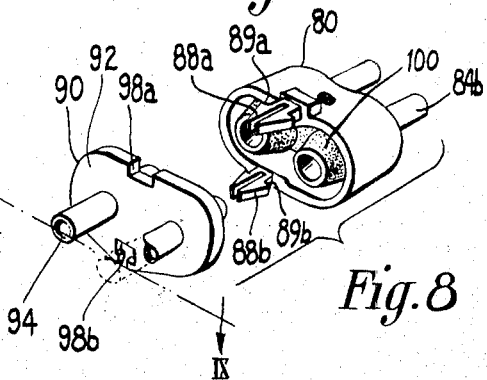

Sept. 30, 1969     W. C. RIESTER ET AL     3,469,863
FLUID COUPLING ASSEMBLY

Filed April 5, 1967     3 Sheets-Sheet 3

INVENTOR.
WILLIAM C. RIESTER and
BRONISLAUS S. GRACZYK
BY
E. Herbert Liss

ATTORNEY.

3,469,863
FLUID COUPLING ASSEMBLY
William C. Riester, Williamsville, and Bronislaus S. Graczyk, Snyder, N.Y., assignors to Trico Products Corporation, Buffalo, N.Y.
Filed Apr. 5, 1967, Ser. No. 628,720
Int. Cl. F16l 39/02, 37/00
U.S. Cl. 285—137                                13 Claims

ABSTRACT OF THE DISCLOSURE

Coupling terminals for connecting conduit harnesses in a fluid system for operating auxiliary equipment in motor vehicles utilizing a series of interlocking connectors to secure one harness of conduits to other harnesses. The terminals are keyed by asymmetry of the conduit connectors, the interlocking connectors or interengaging keyed male and female parts to assure that communication is effected between the proper conduits in different harnesses.

Background of the invention

The present invention relates to harness coupling assemblies for fluid systems.

In motor vehicles where auxiliary equipment is operated by fluid power as, for example, vacuum actuated door locks or other fluid operated systems, it is necessary to string harnesses of fluid conduits throughout various parts of the automobile and it is desirable to conceal these harnesses behind panels of the vehicle body section. This necessarily involves attaching individual conduits of one harness to individual conduits of other harnesses and elements of the system in difficult to reach body areas. The fluid system usually includes branch lines where three or more harnesses meet at a junction.

In stringing harnesses and individual conduits through body panels, the origin of an individual conduit often cannot be seen. Prior to the present invention, individual conduits of each harness were individually connected to conduits of other harnesses and elements of the fluid system. Errors in connecting the proper conduits together were inevitable. Such a procedure, furthermore, is time consuming and expensive. In a single door lock system, there may be as many as fifty individual conduit to conduit connections.

Summary

The above mentioned problems are solved with the present invention by providing unique coupling assemblies. Harness terminals are provided which include a plurality of nipples to receive the individual conduits. A cluster of gland seals is disposed intermediate pairs of terminals connecting adjacent harnesses. The gland seals, the conduits of each harness and the terminals are preassembled. One terminal of a coupling assembly has nipples extending remotely from the conduits which can be plugged into the gland seal of an adjacent terminal. There are also provided interlocking latch connectors on the terminals for interlockingly connecting a pair of adjacent terminals. Where one or more branch harnesses are required, intermediate terminals are provided which include gland seals on one side thereof and nipples to be received in an adjacent gland seal on the other side. Extending outwardly from the body of the intermediate terminals are nipples intersecting the first mentioned nipples which receive intersecting harness conduits. Thus, any number of branch harnesses may be assembled at one junction.

The terminals are keyed so that errors in connecting the proper conduits of separate harnesses together are avoided. In this respect the coupling assembly is fail-safe. Errors cannot be made because the conduits are keyed for proper orientation. Keying is achieved in several ways—

(1) By the asymmetrical arrangement of the nipples on the terminals;
(2) By keyed male and female members formed in the body of adjacent connectors;
(3) By variation in the sizes of the interlocking latch elements of the terminal; and
(4) By the asymmetrical shape of adjacent terminals which are telescopically engageable.

In certain embodiments of the invention visual means for determining proper orientation are provided in that the bodies of the terminals are asymmetrical in shape.

Thus, a unique fluid coupling assembly is provided by this invention which eliminates the hazard of mistakenly connecting improper conduits together. Since each terminal may include as many nipples as there are conduits in a harness, economy in assembly time is effected. Rather than connecting individual conduits, as many as five or more conduits may be connected in a single plug-in operation. The terminals may be preassembled on the harness and are designed so that the gland seals prevent leakage. The present invention eliminates the feat of attaching individual conduits in difficult to reach body areas. Such an operation is normally subject to installation failure, particularly when the assembly line installers are not apprised of what the system must accomplish. This invention insures the protection of a vehicle coming off high production lines with a properly operating fluid system.

The principal object of the present invention is to provide an improved fluid conduit harness coupling assembly which enables multiple conduit harnesses to be connected together in a single plug-in operation resulting in a leakproof connection.

Another object of the invention is to provide an improved coupling assembly for fluid conduit harnesses which enable a junction of any number of harnesses to utilize the quick connect terminals.

Another object of the invention is to provide quick connect coupling assemblies which insure proper orientation of the individual conduits of one harness with respect to the conduits of an adjacent harness in a series of harnesses.

Other objects and advantages of the invention will be apparent from the detailed description taken in connection with the illustrations.

Brief description of the drawings

FIG. 5 is an exploded perspective view of another form of the coupling assembly wherein one of the terminals is an operating component of the fluid system.

FIG. 6 is a side elevational view partly in section of the coupling assembly shown in FIG. 5.

FIG. 7 is an exploded perspective view of another form of the coupling assembly of this invention.

FIG. 8 is an exploded perspective view of another form of coupling assembly.

FIG. 9 is a cross sectional view of the coupling assembly shown in FIG. 8 taken on line IX—IX.

Description of the preferred embodiments

Figure 1:
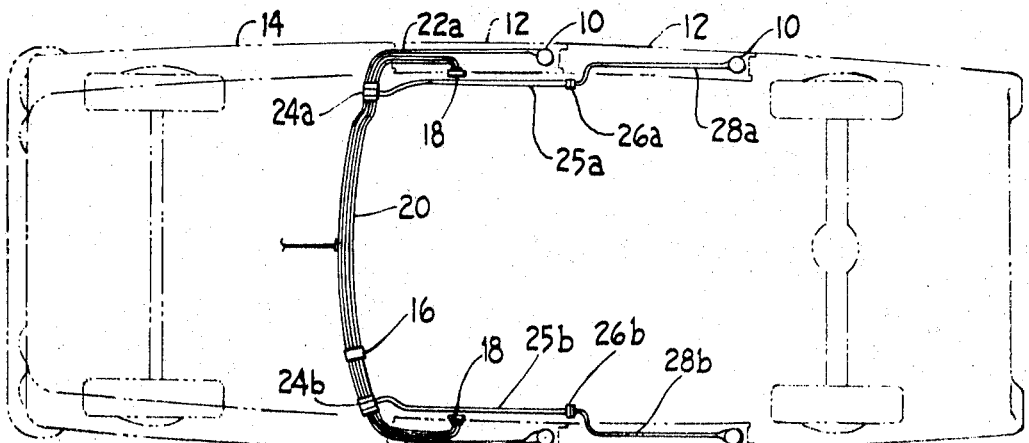
FIG. 1 is a top elevational view in phantom of a motor vehicle embodying the invention.

In FIG. 1 the invention is illustrated in a vacuum operated door lock system for a motor vehicle. The system comprises a fluid actuated power unit 10 located in each door 12 of the vehicle 14. A fluid actuated power unit 10 is mechanically coupled to the latch-lock mechanism in each door for actuation to lock or unlock position. Power units 10 comprise a housing separated having a double acting diaphragm, not shown, separating the housing into a pair of compartments. A central distributor valve 16 is provided for transferring vacuum from a source as, for example, the engine intake manifold, not shown, to one compartment or the other of the power units 10. Manually operated selector valves 18 are provided on each of the front doors 12 for controlling vacuum flow from the source to the distributor valve 16 for actuating it. Since the specific door locking system forms no part of this invention, but is illustrative only of one application for the coupling assembly, neither the system nor the operation thereof will be described in detail. Suffice it to say that in the example shown a harness 20 of five fluid conduits and the remote valve 16 extends laterally across the vehicle. At each end the harness 20 is joined to a harness 22a and a harness 22b, respectively, at junction 24a and junction 24b. Harness 22a and harness 22b also include five conduits, the manually operated selector valve 18 and the power unit 10. At each of the junctions 24a and 24b, harnesses 25a and 25b, each comprising two conduits, extend longitudinally of the vehicle to junctions 26a and 26b where another pair of harnesses, 28a and 28b, are joined. Harnesses 28a and 28b include power units 10 for the rear doors. A vacuum operated door locking system of the general type herein illustrated is shown and described more thoroughly in Patent No. 3,168,932 by R. A. Deibel et al., Feb. 9, 1965, assigned to the assignee of the present invention. It will be understood that in a two-door motor vehicle, harnesses 25a, 25b, 28a and 28b may be omitted.

Figure 3:
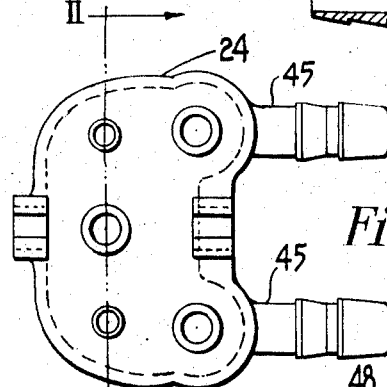
FIG. 3 is a top elevational view of the coupling assembly shown in FIG. 2.
Figure 4:
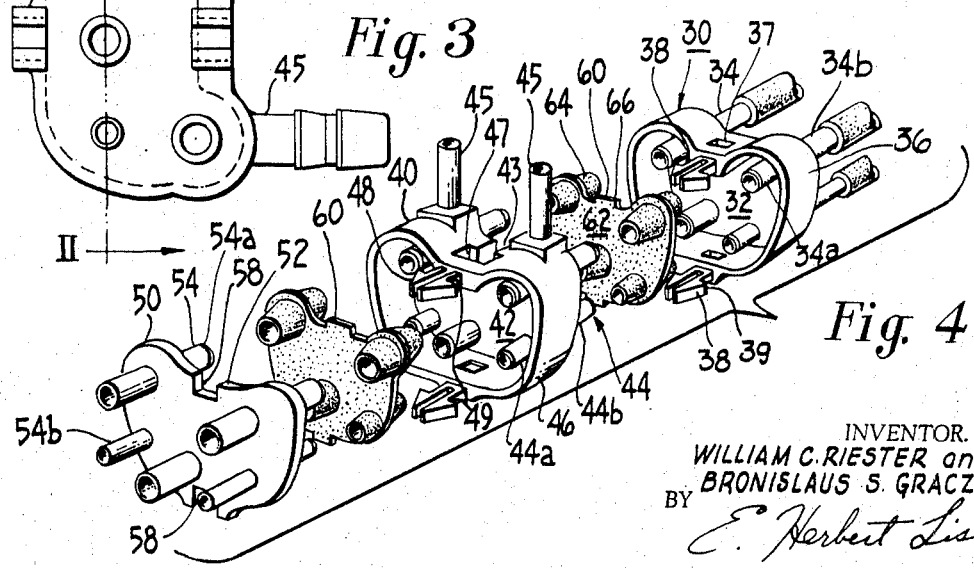
FIG. 4 is an exploded perspective view of the coupling assembly shown in FIGS. 2 and 3.

At junctions 24a and 24b a coupling assembly 24 (see FIGS. 2, 3 and 4) may be utilized. The coupling assembly 24 includes terminals 30, 40 and 50, each including a base member 32, 42 and 52, respectively, having a plurality of nipples 34, 44 and 54, respectively, extending therethrough. The nipples 34, 44 and 54 include internal extensions 34a, 44a and 54a, respectively, and external extensions 34b, 44b and 54b, respectively. It should be noted that some of the nipples 34, 44 and 54 are of different sizes and are asymmetrically located on their respective terminals. It should also be noted that the general shape of the base members 32, 42 and 52 is asymmetrical. The terminals 30, 40 and 50 may be of any suitable or desirable material having some flexibility as, for example, nylon, or other thermo-setting or thermoplastic resins or elastomeric material. The nipples 34, 44 and 54 may be rigidly secured to their respective base members or they may be formed integral therewith.

A peripheral wall 36 extends in the direction of the internal nipple extensions 34a. Extending outwardly from the peripheral wall 36 on opposite edges thereof are a pair of resilient bifurcated latch members 38 having tapered ends forming rearwardly facing shoulders 39 on each side thereof. Openings 37 are disposed on opposite sides of the peripheral wall 36 for a purpose to be explained hereinafter.

Base 42 of intermediate terminal 40 has a peripheral wall 46 extending in the direction of the internal nipple extension 44a. Extending from the peripheral wall 46 in the direction of the internal nipples 44a is a bifurcated latch member 48 similar to the latch member 38 of terminal 30 and includes rearwardly facing shoulders 49. Intermediate terminal 40 differs from terminal 30 in that it includes intersecting nipples 45 which are in fluid communication with a pair of nipples 44. It will of course be understood that there can be as many nipples 45 as there are nipples 44, but in the example illustrated only two nipples 45 are shown. Notches 43 are provided in peripheral wall 46 of terminal 40 and positioned for reception of bifurcated latch members 38 of terminal 30. It should be noted that the nipples 44 are positioned in alignment with nipples 34 of terminal 30 and the general shape of the terminal 40 is the same as the general shape of the terminal 30.

A notch 58 is provided on opposite edges of the base 52 of terminal 50 positioned to receive the locking member 48 or the locking member 38 of terminal 40 or terminal 30. The shoulders 49 or 39 of the terminals 40 or 30 engage the opposite side of the base 52 against the flat surface thereof on each edge of the notch 58. The internal nipples 54a of terminal 50 extend toward the terminal 40 and the terminal 30. The terminal assembly 50 is of the same general outline shape as the terminals 40 and 30 and the nipples 54 are in alignment with the nipples 44 and 34.

Identical sealing assemblies 60 are provided which include a cluster of gland seals 64 extending through a base 62. The sealing members 60 may be of any rubber or rubber-like or other suitable or desirable elastomeric material. One of the gland sealing assemblies 60 is disposed within the recess formed by the peripheral wall 36 and base 32 of the terminal 30. The gland seals 64 receive internal nipples 34a in sealing telescopic engagement. The gland seal is retained by engagement of lugs 66 with openings 37. In the same manner, the other sealing member 60 is disposed in the recess formed by the peripheral wall 46 and base 42 of the terminal 40.

The length of the gland seals 64 may be greater than the distance between the base members 32 and 42 and the distance between the base members 42 and 52 when the coupling is assembled for a purpose to be thereinafter explained.

Prior to assembly in the vehicle, individual conduits of the harness 22a may be connected to the external nipple extensions 34b of terminal 30, thus providing a complete harness including the power unit. Likewise, harness 22b may be assembled in this manner. Conduits of harnesses 25a and 25b may be connected, respectively, to nipples 45 of terminal 40. A terminal of a modified type of coupling assembly to be hereinafter described may be connected to the other ends of harnesses 25a and 25b, respectively. Conduits of harness 20 may be telescopically connected at each end to external nipples 54b of terminal 50. When the harnesses 22a, 22b, 20, 25a and 25b have been secured in their proper positions in the motor vehicle, the terminal assemblies can be snapped together to form a permanent connection. External nipples 44b of terminal 40 are telescopically plugged into the adjacent open ends of gland seals 64. At the same time, latching member 38 will engage notch 43 and snap into interlocking engagement with shoulders 39 engaging the surface adjacent the edge of the notch 43. If the gland seals 64 are of greater longitudinal extent that the distance between the base 32 and the base 42 in the connected position, the periphery of the gland seals will engage the bases 32 and 42 to provide a seal at their ends as well as along the side wall. This feature can best be seen in FIG. 2. Furthermore, because of the resiliency of the gland seals and because of their longitudinal extent, they will be in compression. Tension will be applied between bases 32 and 42, tending to push the terminals 30 and 40 apart, thus providing a firm engagement between latching member 38 and notch 43. In the same manner, terminal 50 may be plugged into the gland seals of terminal 40 with latching member 48 engaging in notch 58. It will of course be understood that where branch harnesses are not used, intermediate terminal 40 may be omitted. For example, a two-door vehicle utilizing the illustrated door locking system will not require branch harnesess 25a and 25b. In this case terminal 30 will interlock with terminal 50 as above described.

In FIGS. 5 and 6 a different form of the coupling assembly is shown. In this form of the invention, an operating element of the fluid system forms one terminal of the coupling assembly. In the example illustrated, the valve section of the manually operated selector valve 18 is utilized as one terminal. The other terminal 70 is connected to three of the conduits of harness 22a. The valve section 19 of manual selector valve 18 has three nipples 21 extending therefrom and a latching lug 23 on the base of the valve. The terminal 70 comprises a housing having a base 72, a bottom wall 73 and side walls 74 with inwardly extending flanges 74'. It also includes a partial top wall 75 and nipples 76 having external extensions 76a and internal extensions 76b extending through the base wall 72. An opening in the top wall is formed by its internal edge and the internal edges of the flanges 74'. This opening and the flanges 74' embrace the valve 19 when it is in its connected position. A sealing member 80a comprising a cluster of gland seals 82a positioned to receive the internal extension 76b of nipple 76 is provided and is retained within the terminal 70 by a lug 83a which engages an opening 77 in the top wall 75 of the terminal. On one end the gland seals telescopically engage the internal extensions 76b of the nipple 76. The terminal is then plugged onto the manual selector valve so as to receive the nipple 21 telescopically in the other ends of the gland seals 82a, at which time the opening 78 in the bottom wall 73 engages the latching lug 23 on the valve 19 to provide a permanent connection. Again, the gland seals 82a may be greater in longitudinal extent than the distance between the side wall of the valve 19 and the base 72 of the terminal 70 to provide improved sealing as well as tension for firm engagement between the latching lug 23 and opening 78.

In FIGS. 8 and 9 another form of the invention is shown which is especially suitable for use with harnesses for two fluid conduits. The construction is essentially the same as the FIG. 2 embodiment, omitting the intermediate terminal. Intermediate terminals may be provided if necessary. The coupling assembly of FIG. 8 comprises a terminal 80 and a terminal 90. The terminal 80 includes a base 82 and an upstanding peripheral side wall 86 with nipples 84 extending through the base wall 82 and having internal extensions 84a and external extensions 84b. Resilient bifurcated latching members 88a and 88b are provided on opposite edges, having rearwardly facing shoulders 89a and 89b, respectively. A cluster of gland seals 102 is provided forming a sealing member 100 which is telescopically connected to the internal extensions 84a of the nipples 84. Because of the unavoidable symmetry of a two-nipple terminal, the locking members 88a and 88b are made of different sizes so that they cannot be interchangeably secured in the different sized notches 98a and 98b of the terminal 90. Terminal 90 includes a base member 92 having nipples 94 extending therethrough with an internal extension 94a and an external extension 94b. The edges of the base member 92 are notched as at 98a and 98b with different size notches corresponding to latching members 88a and 88b, respectively. As in the previously described embodiments, the terminal 90 may be plugged into the terminal 80 with its internal nipples 94a telescopically received in gland seals 102 while the latching members 88a and 88b, respectively, engage in notches 98a and 98b, respectively, with the rearwardly facing shoulders 89a and 89b engaging the opposite side of the base 92 adjacent the edges of the notches 98a and 98b.

The embodiment shown in FIG. 7 is similar to the embodiment illustrated in FIGS. 8 and 9. Terminal 80' is similar to terminal 80 and terminal 90' is similar to terminal 90. The only differences therebetween are the outline shapes of the terminals 80' and 90' which are rounded as at 81 and 91 and flat at 83 and 93 to give a visual indication of the proper orientation of terminals 80' and 90' with respect to each other. In lieu of using different sizes, latching prongs 88' of the same size are used on both edges of the terminal 80'. A keyed projection 87 on terminal 80' is provided which is insertable in a matchingly keyed recess 97 of terminal 90' to mechanically insure proper orientation of the terminals with respect to each other. A sealing member 100' comprising a cluster of gland seals 102 is provided and is disposed and utilized similarly to the sealing member 100 in the FIG. 6 embodiment. Again, the sealing member 100' may be of greater longitudinal extent than the distance between the base wall 92' of terminal 90' and the base wall (not visible) of terminal 80' to provide tension for a firm engagement of the interlocking connecting members 88' with the notches 98' of terminal 90'.

Figure 10:
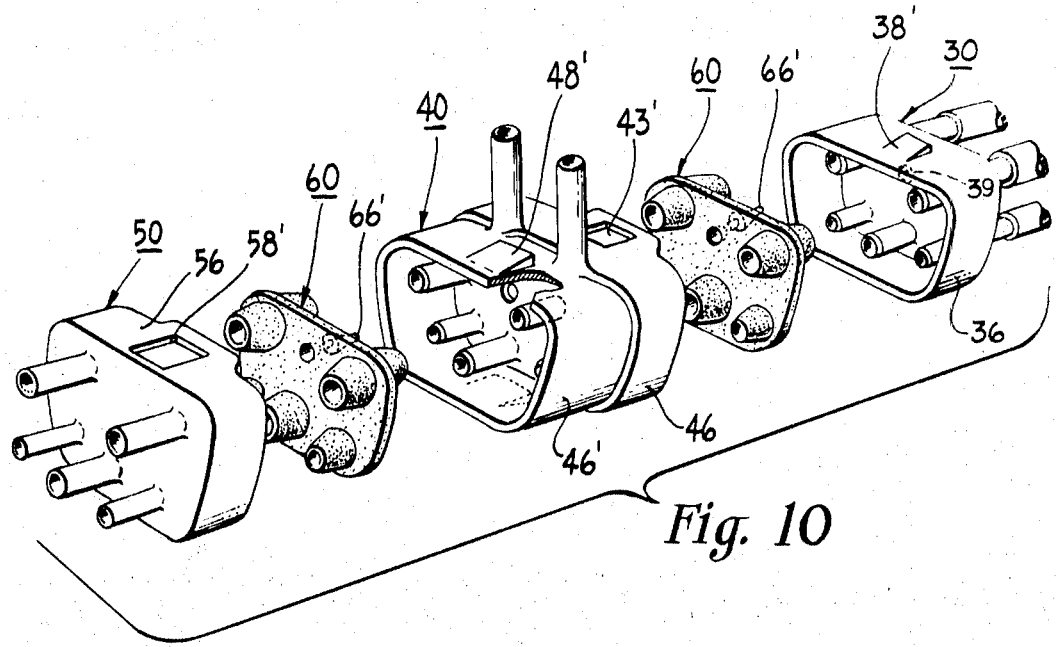
FIGS. 10 and 11 are exploded perspective views of other preferred modifications of the invention.
Figure 11:
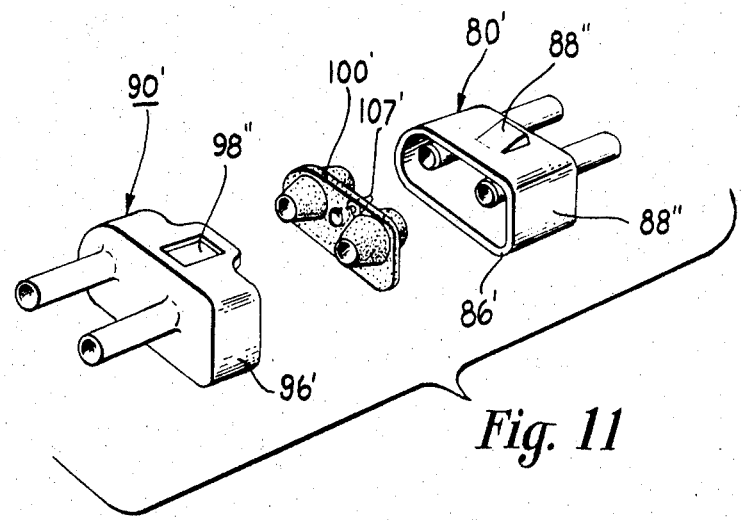

Still other preferred embodiments are illustrated in FIGS. 10 and 11. The FIG. 10 embodiment of the coupling assembly is similar to the embodiment shown in FIGS. 2, 3 and 4 and identical reference numerals are utilized to designate identical elements.

Figure 2:
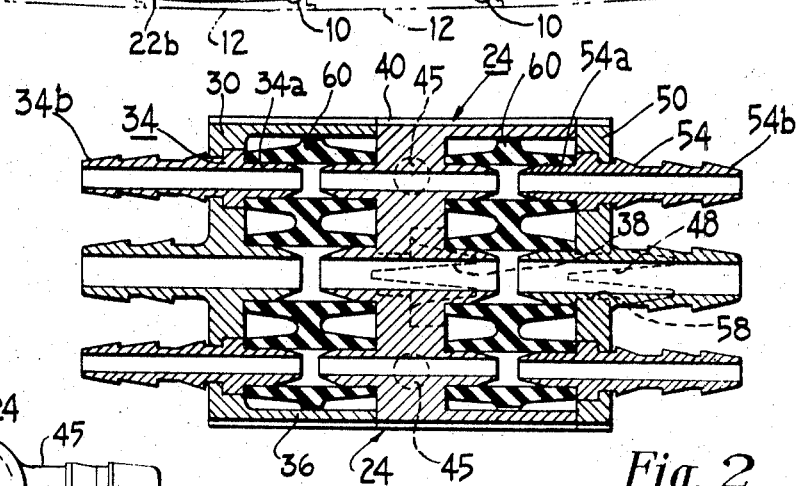
FIG. 2 is a sectional view of one form of coupling assembly taken on line II—II of FIG. 3.

The terminal 50 includes a peripheral wall 56 having a latch opening 58' in lieu of the notch 58 of the FIG. 2 embodiment. A peripheral wall 46' of reduced external dimensions is provided on terminal 40 which can be received telescopically within peripheral wall 56 of terminal 50. A ramp-type catch 48' is provided in lieu of the latch prongs 48 in the FIG. 2 embodiment. The ramp-type catch 48' engages in the latch opening 58' to securely latch terminal 40 to terminal 50. A latch opening 43' is provided in the peripheral wall 46 of terminal 40 in lieu of the notch 43 and ramp-type catches 38' are provided on the exterior surface of the wall 36 of terminal 30 for engagement with the latch opening 43' of terminal 40. The peripheral wall 36 of terminal 30 is telescopically receivable within the peripheral wall 46. The nesting or telescoping arrangement of the peripheral walls 36, 46, 46' and 56 provide keying means to insure proper orientation of the terminals with respect to each other. The sealing members 50 are provided with protuberances 66' in lieu of the lugs 66 for engagement with openings 47 in terminal 40 and openings 37 in terminal 30 to retain the sealing members 60 in position.

The FIG. 11 embodiment is similar to the FIG. 7 embodiment, but differs therefrom in omission of the latching prongs 88' and the keying components 87 and 97. The terminal 80' is provided with ramp-type catches 88" on opposite walls. The terminal 90' is provided with a latch opening 98" in lieu of the notch 98' on a peripheral wall 96'. The gland seal 100' is provided with a protuberance 107' for engagement with an opening in the base wall, not shown, of the terminal 80' to retain the sealing member 100' therein. The peripheral wall 86' is telescopically insertable within the peripheral wall 96' of terminal 90'. Because of the asymmetrical outline shape of the peripheral walls 86' and 96', proper orientation of the terminals 80' and 90' with respect to each other is assured. The ramp catch 88" engages the latch opening 98" to retain the parts in interlockingly connected engagement.

It should now be apparent that an improved coupling assembly has been provided for connecting a plurality of harnesses, each comprising a plurality of fluid conduits. The coupling assemblies insure proper orientation of the conduits of one harness with respect to the conduits of another harness. They provide economy in assembly, facilitate manufacturing and reduce the labor involved, eliminate human failure by permitting a plurality of conduits to be quickly and firmly connected together without the necessity of judgment or the laborious time consuming operation of connecting individual conduits one to another in a series. Certain specific embodiments of the invention have been described for the purpose of illustration, but it will be apparent that various modifications and other embodiments are possible within the scope of the invention. For example, a single connector of the type shown in FIG. 5 may be employed at the power units 10. It is to be understood therefore, that the invention is not limited to the specific arrangement shown, but in its broadest aspects it includes all equivalent embodiments and modifications which come within the scope of the invention.

We claim:

1. A fluid coupling assembly for connecting a plurality of fluid conduit harnesses together, each harness including a plurality of fluid conduits, said fluid coupling assembly including a pair of terminals, each of said terminals comprising a base member, a plurality of external tubular nipples extending from said base member and a plurality of internal tubular nipples extending from said base member, each of said external nipples being in fluid communication with an internal nipple, each of said external nipples being adapted to receive a fluid conduit, a sealing gland of elastomeric material having a base plate and a plurality of tubular gland seals extending from both sides of the base plate telescopically receiving internally, opposing internal nipples of adjacent terminals in sealing engagement, means for interlockingly connecting adjacent terminals, the length of the gland seals being greater than the distance between the base members of the terminals to provide improved sealing as well as tension in the interlocking connecting means.

2. A fluid coupling assembly according to claim 1 wherein one of said terminals is an element of an operating assembly in a fluid system.

3. A fluid coupling assembly according to claim 1 wherein one of said terminals comprises a wall member and a cluster of nipples having extensions on opposite sides of said wall member.

4. A fluid coupling assembly according to claim 1 wherein the terminals include keying means for interlockingly connecting a terminal in only one orientation with respect to an adjacent terminal whereby selected conduits of one harness can only be connected for fluid communication with selected conduits of an adjacent harness.

5. A fluid coupling assembly according to claim 1 wherein said means for interlockingly connecting adjacent terminals comprise a resilient bifurcated latch member and a notch wherein the resilient bifurcated latch member of one terminal is latchingly engageable in a notch of an adjacent terminal.

6. A fluid coupling assembly according to claim 1 wherein said base members include a peripheral wall, the peripheral wall of one base member being telescopically receivable within the peripheral wall of an adjacent base member.

7. A fluid coupling assembly according to claim 4 wherein the keying means comprise an asymmetrical disposition of nipples whereby the internal nipples of adjacent terminals can engage the gland seals only in one orientation of the terminals with respect to each other.

8. A fluid coupling assembly according to claim 1 wherein the keying means comprise interengageable male and female keyed members on adjacent terminals, respectively.

9. A fluid coupling assembly according to claim 5 wherein said interlocking connecting means includes a pair of resilient latch members, each being a different size, and a pair of corresponding notches whereby each of said resilient latch members can engage a corresponding notch in an adjacent terminal only in a selected orientation of adjacent terminals.

10. A fluid coupling assembly according to claim 6 wherein the peripheral walls of adjacent terminals have a ramp catch and a latch opening, respectively, for lockingly connecting said adjacent terminals.

11. A fluid coupling assembly according to claim 10 wherein said peripheral walls are asymmetrical in shape whereby adjacent terminals can be connected together only in one orientation of the terminals.

12. A fluid coupling assembly for connecting a plurality of harnesses together, each harness including a plurality of fluid conduits, said fluid coupling assembly including a plurality of terminals, each of said terminals comprising a base member, a plurality of external tubular nipples extending from said base member and a plurality of internal tubular nipples extending from said base member, each of said external nipples being in fluid communication with an internal nipple, each of said external nipples being adapted to receive a fluid conduit, a sealing gland of elastomeric material having a base plate and a plurality of tubular gland seals extending from both sides of the base plate telescopically receiving internally the opposed internal nipples of adjacent terminals in sealing engagement, means for interlockingly connecting adjacent termials and keying means for properly orienting adjacent terminals with respect to each other, the length of the gland seals being greater than the distance between the base members of the terminals to provide improved sealing as well as tension in the interlocking connecting means.

13. A fluid coupling assembly according to claim 12 including an intermediate terminal adapted to be connected between a pair of terminal assemblies comprising a base member having nipples extending outwardly from opposite sides thereof, telescopically received within adjacent tubular gland seals of elastomeric material, and latch means for securing the intermediate terminal to adjacent terminals on opposite sides thereof.

References Cited

UNITED STATES PATENTS

| | | | |
|---|---|---|---|
| 2,457,478 | 12/1948 | Letvin | 285—137 X |
| 2,628,850 | 2/1953 | Summerville | 285—137 X |
| 2,701,147 | 2/1955 | Summerville | 285—137 X |
| 2,758,291 | 8/1956 | Richards | 339—94 |
| 2,964,437 | 12/1960 | Appleton et al. | 285—137 X |
| 3,146,051 | 8/1964 | Woofter et al. | 339—91 X |
| 3,154,281 | 10/1964 | Frank | 339—126 X |
| 3,154,365 | 10/1964 | Crimmins | 339—91 X |
| 3,163,448 | 12/1964 | Franklin | 285—137 |
| 3,214,195 | 10/1965 | Zahuranec et al. | 285—27 |
| 3,277,422 | 10/1966 | Shevlin. | |
| 3,305,249 | 2/1967 | Zahuranec | 285—137 X |

FOREIGN PATENTS

| | | |
|---|---|---|
| 245,479 | 7/1963 | Australia. |
| 1,005,793 | 4/1957 | Germany. |

THOMAS F. CALLAGHAN, Primary Examiner

U.S. Cl. X.R.

277—225; 285—169; 319, 379